US006559870B1

(12) United States Patent
Anabuki et al.

(10) Patent No.: US 6,559,870 B1
(45) Date of Patent: May 6, 2003

(54) USER INTERFACE METHOD FOR DETERMINING A LAYOUT POSITION OF AN AGENT, INFORMATION PROCESSING APPARATUS, AND PROGRAM STORAGE MEDIUM

(75) Inventors: Mahoro Anabuki, Yokohama (JP); Yuko Moriya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/503,201

(22) Filed: Feb. 14, 2000

(30) Foreign Application Priority Data

Mar. 26, 1999 (JP) .......................... 11-084661

(51) Int. Cl.⁷ .......................... G06F 3/14; G06T 17/00
(52) U.S. Cl. .................. 345/849; 345/706; 345/419; 345/848
(58) Field of Search ................. 345/849, 706, 345/775, 850, 848, 757, 419, 427, 421, 839, 705, 708, 753, 759, 967, 977

(56) References Cited

U.S. PATENT DOCUMENTS

| | | | | |
|---|---|---|---|---|
| 5,347,306 A | * | 9/1994 | Nitta ...................... 345/753 X |
| 5,367,454 A | | 11/1994 | Kawamoto et al. ......... 364/419 |
| 5,563,988 A | * | 10/1996 | Maes et al. .................. 345/421 |
| 5,761,644 A | | 6/1998 | Ueda et al. .................... 705/1 |
| 5,956,038 A | * | 9/1999 | Rekimoto ................... 345/419 |
| 6,154,211 A | * | 11/2000 | Kamachi et al. ............. 345/419 |
| 6,219,045 B1 | * | 4/2001 | Leahy et al. ................. 345/757 |
| 6,342,892 B1 | * | 1/2002 | Van Hook et al. ....... 345/419 X |

FOREIGN PATENT DOCUMENTS

| | | | |
|---|---|---|---|
| JP | 6-12401 | | 1/1994 |
| JP | 8-55130 | | 2/1996 |
| JP | 09-231413 | * | 9/1997 |
| JP | 11-73289 | | 3/1999 |

OTHER PUBLICATIONS

"The End User Networking Platform with Learning Agent for Construction of Interactive and Virtual Service Space:," Nakazawa, et al., The Journal of Institute of Electronics, Information and Communication Engineers, Dec. 1998, vol. J81–B–1, No. 12, pp. 850–860.

"'Paw' Virtual Space Business—Methods for Success in this Unlimited World" Koichi Matsuda, Nikkei CG, Japan, Dec. 8, 1998, pp. 152–157 (includes an English Translation).

"The ALIVE system: wireless, full–body interaction with autonomous agents," Pattie Maes, et al., ACM Multimedia Systems, vol. 5, No. 2, pp. 105–112, 1997 (ISSN: 0942–4962).

* cited by examiner

Primary Examiner—Raymond J. Bayerl
(74) Attorney, Agent, or Firm—Fitzpatrick, Cella, Harper & Scinto

(57) ABSTRACT

A system displays an agent character, which does not give any anxious feeling to the user and is easy to use, by taking into consideration the position/posture of the user. Upon displaying the agent character, the distance from the user and the line-of-sight direction of the user are taken into consideration, and the agent character is inhibited from being located at the closest distance position in front of the user. When the user does not communicate with the agent character, the agent character is located in a far zone in front of the user. When the user communicates with the agent character, the agent character is located in a middle-distance zone in front of the user.

6 Claims, 11 Drawing Sheets

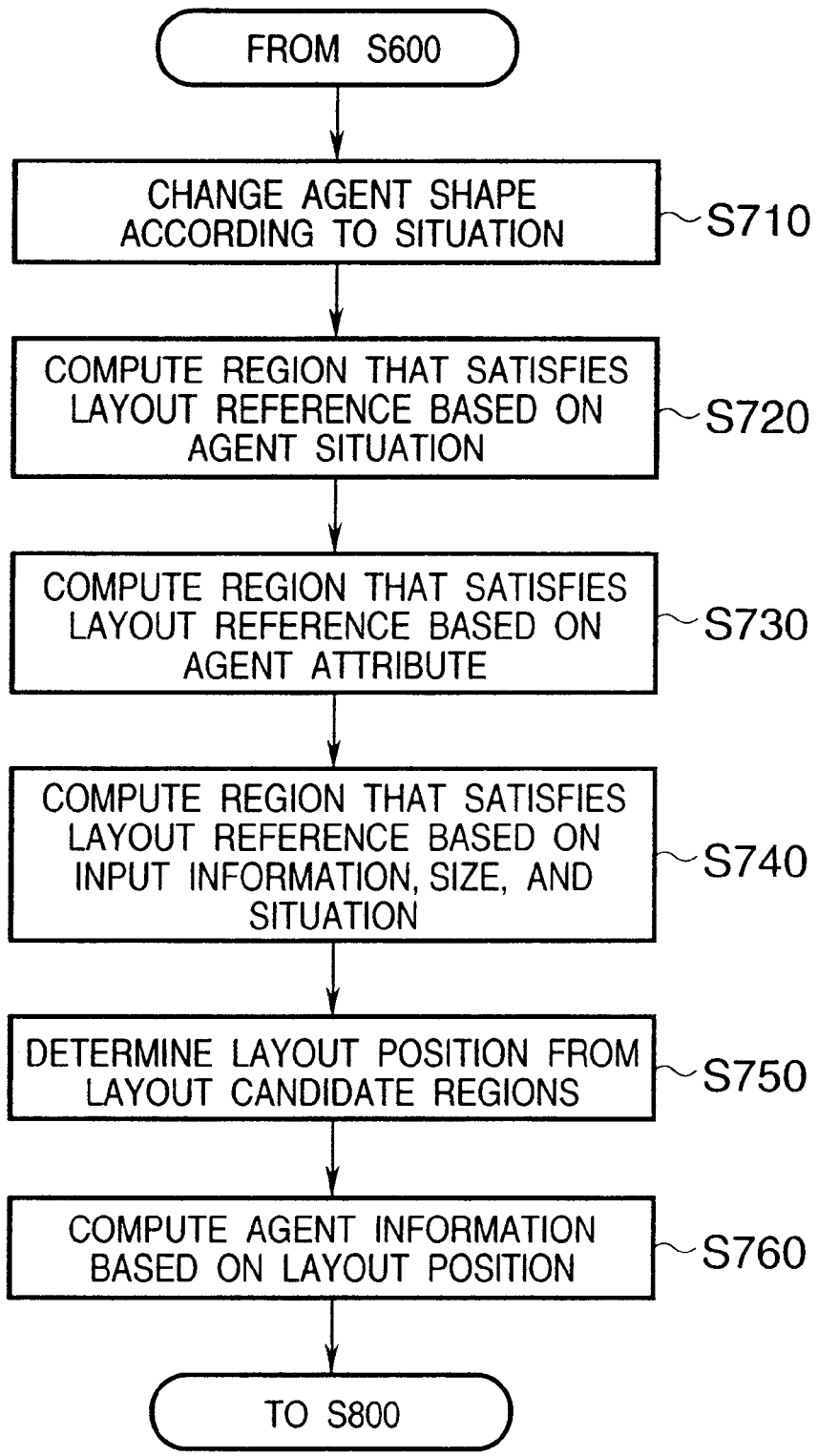

USER INTERFACE METHOD FOR DETERMINING A LAYOUT POSITION OF AN AGENT, INFORMATION PROCESSING APPARATUS, AND PROGRAM STORAGE MEDIUM

FIELD OF THE INVENTION

The present invention generally relates to a user interface in an interactive application environment and, more particularly, to an agent character supported user interface.

The present invention especially relates to an agent layout determination method in a "three-dimensional space (a virtual reality space and a mixed reality space obtained by superposing the virtual reality space onto a real space)", which does not impose negative influences (coerced and anxious feelings) on the user.

BACKGROUND OF THE INVENTION

Along with the advance of multimedia information presentation technologies, huge volume of information is presented to the user and it may often become difficult for the user to understand what kind of request is needed to be input to a computer or what is required of him or her by the computer system.

Under these circumstances, conventionally, Windows as an operating system available from Microsoft Corp., or Word as a wordprocessing application program displays an agent character to give a guidance to the user in response to a user request or when a predetermined condition for the program is satisfied.

An agent character provided by such program is the one for a display environment of a two-dimensional image, and does not consider the gazing position of the user on the display screen.

As known technologies pertaining to agent characters, for example, Japanese Patent Laid-Open No. 9-153145 (Laid-Open date: Jun. 10, 1997), "Computer which sees, hears, and talks with smile (Multimodal interactive system)", Electrotechnical Laboratory Press Meeting Reference, and Lewis Johnson, Jeff Rickel, Randy Stiles, & Allen Munro, "Integrating Pedagogical Agents into Virtual Environments", *Presence*, Vol. 7, No. 6, pp. 523–546, are known.

An "agent display apparatus" disclosed by Japanese Patent Laid-Open No. 9-153145 is a technique for agent display implemented as a user interface which makes processes in correspondence with user's purpose, favor, and skill level. More specifically, a plurality of types of agent states (appearances (costumes of agent), modes of expression, and emotional expressions) are prepared, and a combination of agent states is determined in correspondence with user's purpose, favor, and skill level, thus displaying an agent character in the determined combination.

However, the technique disclosed by this reference does not essentially consider any three-dimensional space.

"Computer which sees, hears, and talks with smile (Multimodal interactive system)", Electrotechnical Laboratory Press Meeting Reference was released at a home page having the world wide web URL address "www.etl.go.jp/etl/mmpress/mmpress.html" (updated Nov. 9, 1996), and pertains to an agent implementation technique present in a three-dimensional space. More specifically, this paper is a study about a prototype agent which comprises real-time image recognition, speech recognition, and speech synthesis functions. This paper aims at exploring specific specifications that a computer must satisfy to implement smooth interactions, and acknowledging technical problems to be solved. In this paper, an agent is present in a virtual space in a display, and interacts with the user via the window (screen). However, in this reference, the agent is always displayed at a given position, and never changes its position in consideration of its position relative to the user.

As for an agent character display technique in a three-dimensional space as an objective of the present invention, "Integrating Pedagogical Agents into Virtual Environments" discloses a study of a system which reconstructs a life-size virtual three-dimensional work space, and allows the user to learn a task process with the help of an agent. When the user who wears an HMD selects a given menu item, the agent responds by synthetic voice. When the user selects a task demonstrate menu (Show Me!), the agent responds by its actions.

However, in this prior art, the agent makes only predetermined actions, and the display layout of the agent character does not consider relative position between the user position and the display position of the agent character.

In order to realize a user interface in a display environment of a three-dimensional image, the agent character must also be displayed as a three-dimensional image. That is, the agent character is also given a three-dimensional display position and scale.

FIG. 1 explains a case wherein the agent character given a certain scale value is displayed in an unexpected size and surprises the user. More specifically, since the agent character is given a three-dimensional display position and scale in a three-dimensional image space, if the user wants to communicate with the agent character at a close distance in a three-dimensional display environment in which the agent character is given the same size as that of a human being, a program that presents the agent character displays the "face" of the agent character in the same size as that of a human face, as shown in FIG. 1. In some cases, the face of the agent character is displayed in a full size of the display screen, and makes the user feel anxious or coerced.

Or even when the display size of the agent character is not so large, the agent character may occlude an object the user wants to see depending on the viewpoint position of the user, as shown in FIG. 2.

Such problems do not normally occur in a two-dimensional display space, and occur only in a three-dimensional display space when the viewpoint position/posture of the user, and the position of the agent character are not taken into consideration.

The aforementioned Electrotechnical Laboratory Press Meeting Reference does not pose such problems due to limitations, i.e., since the agent is always displayed at a predetermined position.

Also, in "Integrating Pedagogical Agents into Virtual Environments", since the agent makes only predetermined actions, as described above, the above problems do not occur.

In other words, in an environment in which a three-dimensional agent character freely moves in a three-dimensional space, the aforementioned prior arts cannot avoid the problems shown in FIGS. 1 and 2.

SUMMARY OF THE INVENTION

The present invention has been proposed to solve the conventional problems, and has as its object to provide a user interface or an agent character layout determination method, which considers position relative to the user so as not to impose negative influences on the user.

In order to achieve the above object, according to the present invention, a user interface method which three-dimensionally displays a character designated by a program, and allows the user to interact with a computer system while communicating with the displayed character, comprises the steps of:

estimating a region of interest of the user;

estimating a display purpose of information in an application program; and determining a three-dimensional display pattern of the character by applying a rule, which aims at preventing display of the character from being against user's interest, to the estimated region of interest of the user and the estimated display purpose of information.

By considering the region of interest of the user, e.g., the position or line-of-sight direction of the user, the user can be free from any negative influences.

According to a preferred aspect of the present invention, in the rule a reference value used to determine if display of the character is against user's interests is changed in accordance with a distance from the user.

According to a preferred aspect of the present invention, in the rule a reference value used to determine if display of the character is against user's interests is changed in accordance with a distance from the user on a front side of a line-of-sight direction of the user.

According to a preferred aspect of the present invention, display of the character is inhibited in a first zone which has a distance from the user less than a first distance, and display of the character is permitted in a second zone which has the distance from the user that falls within a range from the first distance to a second distance larger than the first distance, and a third zone which is farther than the second distance.

According to a preferred aspect of the present invention, in the rule when the user and character do not communicate with each other, the character stays in the third zone which is farther than the second distance.

According to a preferred aspect of the present invention, in the rule when the user and character communicate with each other, the character is located in the second zone.

According to a preferred aspect of the present invention, in the rule the position/posture of the user are detected, and the character is located so as to prevent the region of interest from being occluded by the character from the detected position/posture of the user.

According to a preferred aspect of the present invention, in the rule the position/posture of the user are detected, and the character is located so as to prevent the character from being occluded by the region of interest from the detected position/posture of the user.

According to a preferred aspect of the present invention, in the rule the character is located not to fall in the region of interest.

According to a preferred aspect of the present invention, in the rule when an object to be manipulated by the character is present in the region of interest, the character is located within a range in which the object is accessible.

According to a preferred aspect of the present invention, if there are a plurality of different layout positions of the character, which satisfy the rule, the character is located at a position which can minimize a distance between the region of interest and the layout position of the character.

According to a preferred aspect of the present invention, if there are a plurality of different layout positions of the character, which satisfy the rule, and the region of interest is not present, the character is located at a layout position closest to the user.

In some cases, a plurality of layout candidates may be present depending on the two layout conditions.

According to a preferred aspect of the present invention, if there are still another plurality of different layout positions of the character, which satisfy the rule, the character is located at one of the plurality of different layout positions.

According to a preferred aspect of the present invention, if a layout position that satisfies the rule is not present, the character is located outside a field of view of the user.

According to a preferred aspect of the present invention, the rule further considers a size of the character.

According to a preferred aspect of the present invention, the rule further considers an attribute of the character.

According to a preferred aspect of the present invention, the size is determined in advance in correspondence with the character.

According to a preferred aspect of the present invention, the attribute is determined in advance in correspondence with the character.

According to a preferred aspect of the present invention, the rule further considers a situation of the character.

According to a preferred aspect of the present invention, the situation of the character considers if the character is waiting for an instruction from the user, having conversation with the user, or is automonously moving.

The above object can also be achieved by a storage medium which stores a program code for implementing the user interface or an information processing apparatus which stores and executes that program code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flow chart for explaining the control sequence of the agent layout module 401.

DETAILED DESCRIPTION OF THE PREFERRED EMBODIMENTS

A library information navigation system according to a preferred embodiment of the present invention will be described hereinafter with reference to the accompanying drawings.

Figure 1:
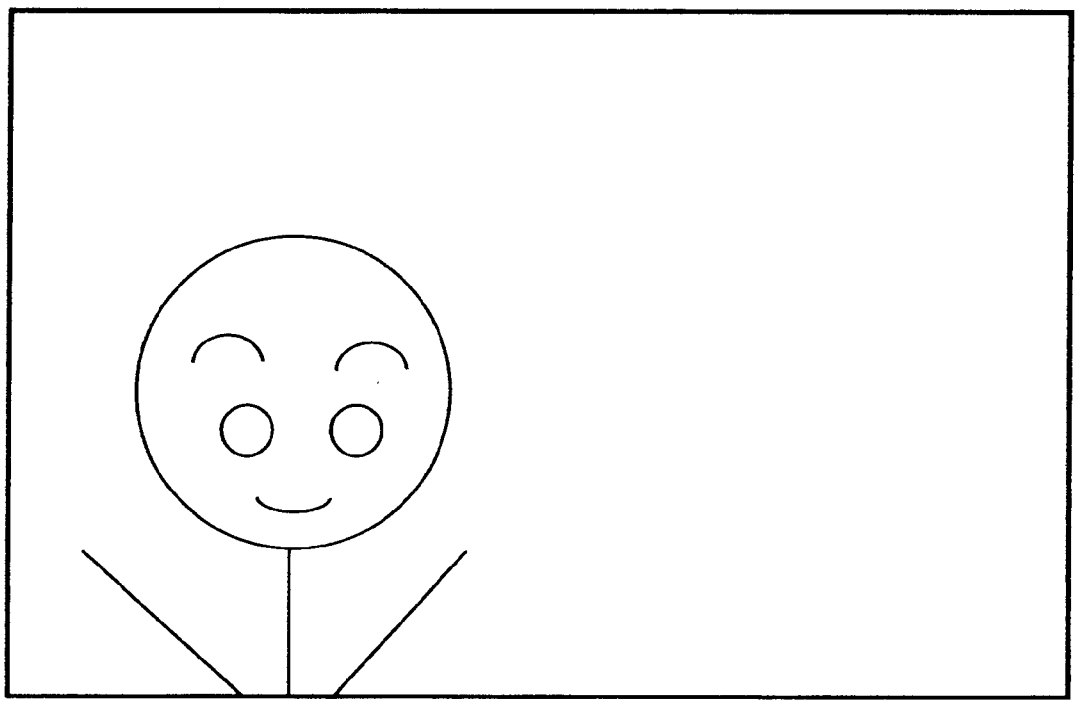
FIG. 1 is a view for explaining a problem of conventional agent character display.
Figure 2:
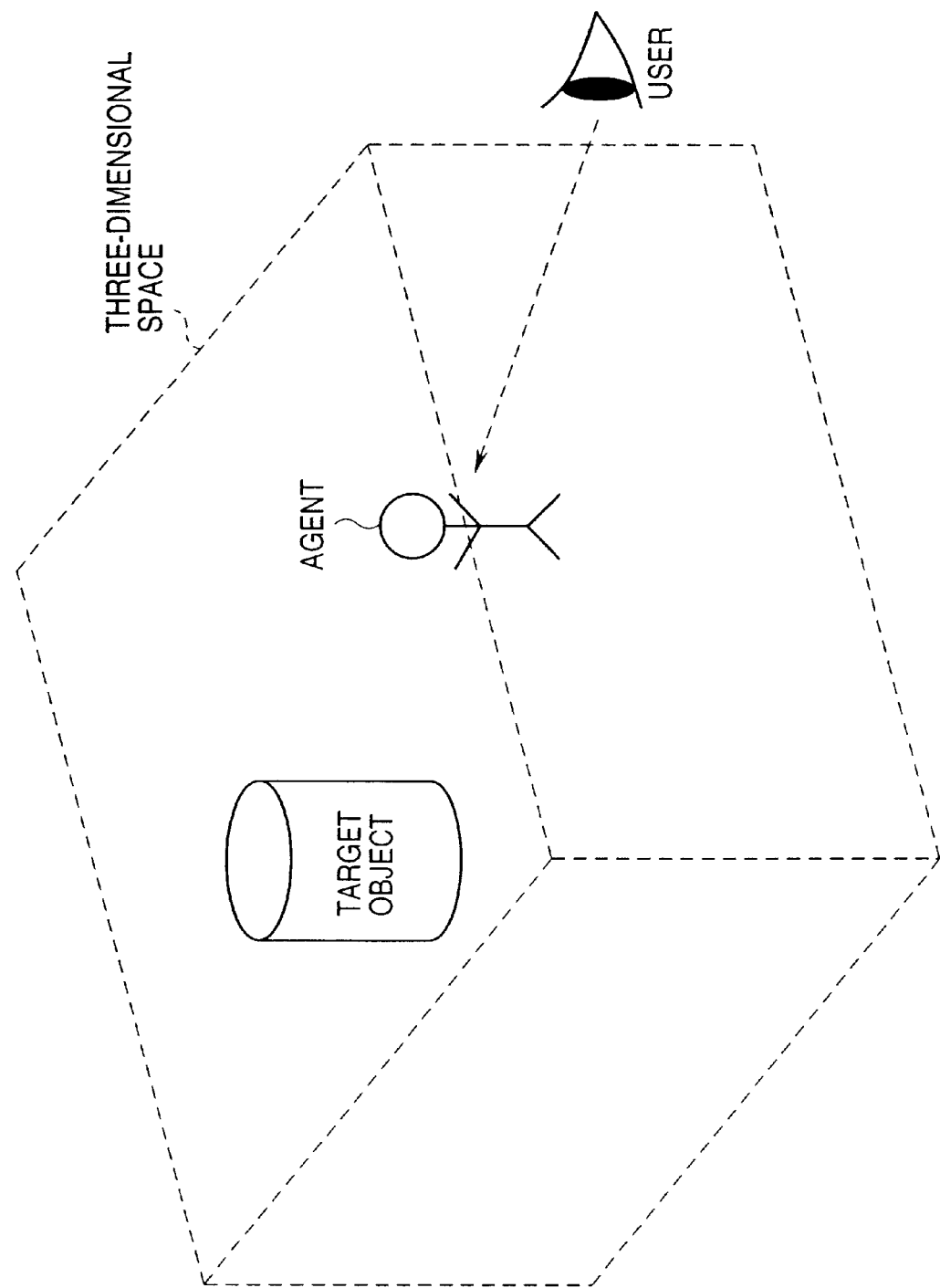
FIG. 2 is a view for explaining another problem of conventional agent character display.
Figure 3:
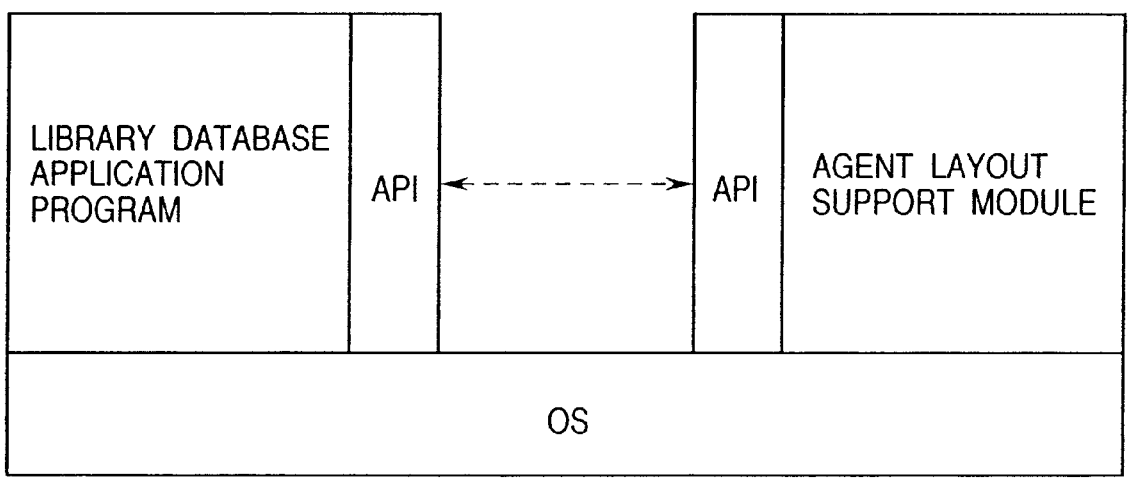
FIG. 3 is a block diagram showing the system arrangement when the present invention is applied to a library database application.

In this system, as shown in FIG. 3, an agent layout support module group according to the present invention, which is running under the control of a general operating system provides a user interface environment to a library information database application program, which is running under the control of the general operating system. The database application program and agent layout support module group make inter-program communications using known application program interfaces (APIs) via the operating system.

Figure 4:
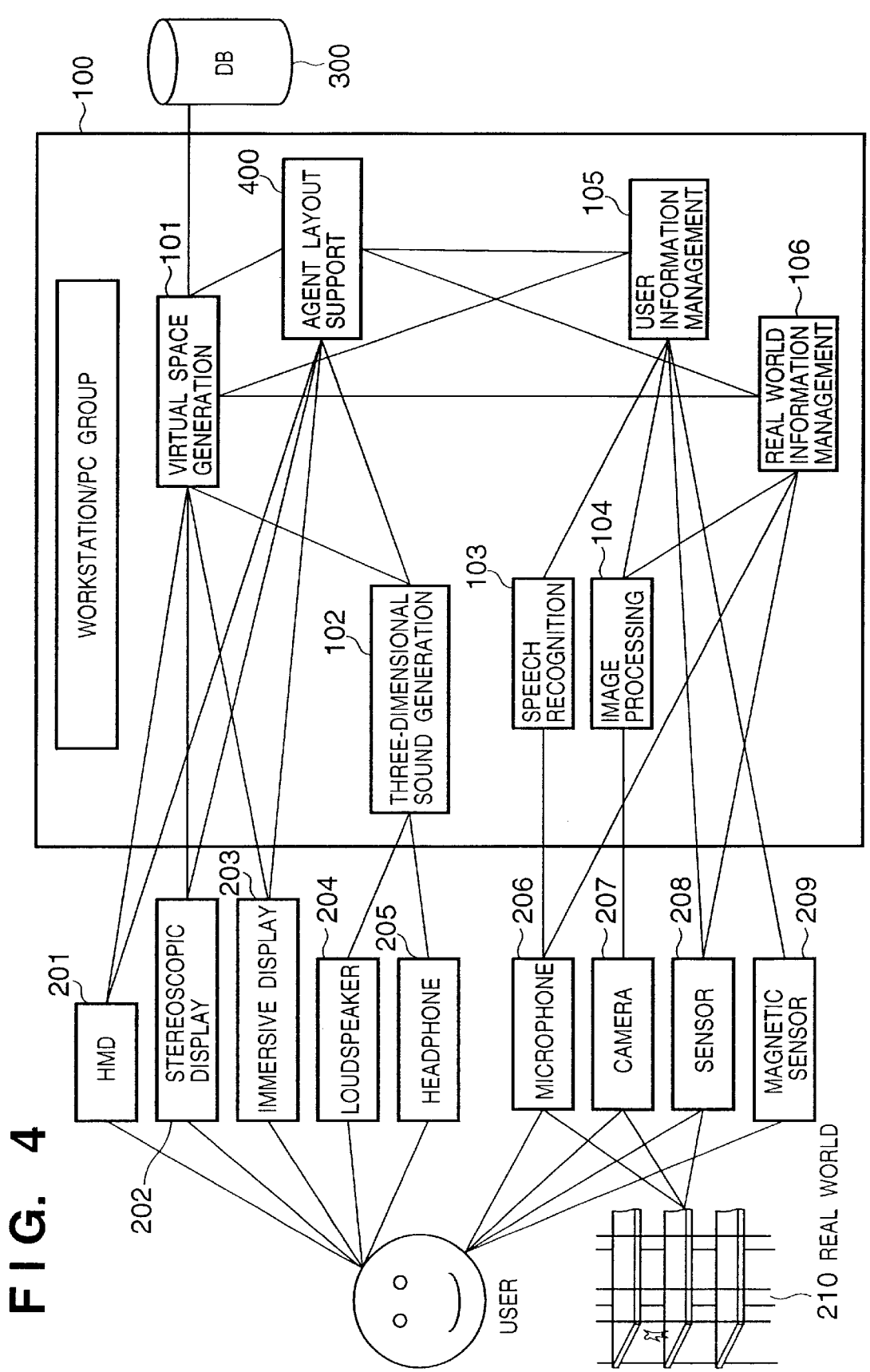
FIG. 4 is a block diagram showing the hardware arrangement of input/output devices of the system shown in FIG. 3.

FIG. 4 shows the hardware environment of this system. More specifically, most of modules of this system are stored in a workstation (or PC) group 100. Various input/output devices are connected to this workstation/PC group 100. An HMD 201, stereoscopic display 202, or immersive display 203 provides a three-dimensional image to the user. One of these displays can be arbitrarily used. The three-dimensional image is provided from the workstation/PC group 100, and an agent character is built in this provided three-dimensional image.

A loudspeaker 204 and headphone 205 provide audio information including voice of the agent. Either the loudspeaker 204 and headphone 205 can be arbitrarily used.

A microphone 206 is used to collect the user voice and sound from a real world 210.

Images of the user and real world 210 are captured by a camera 207.

The positions of the user and real world 210 are detected by an infrared sensor 208. Since this system aims at providing library information, the real world 210 corresponds to bookshelves. The position of each bookshelf is recognized by detecting infrared light emitted by an infrared ray emitter set on each bookshelf by the sensor 208, and analyzing the signal output from the sensor 208 by the workstation/PC group 100. The viewpoint position/posture of the user are detected by the infrared sensor 208 and a magnetic sensor 209.

In the system shown in FIG. 4, a virtual space presented to the user is output to and displayed on the HMD 201 or the like by merging a virtual three-dimensional image generated based on data from a library database 300 and the agent character the data of which is generated by the agent layout support module group. The database 300 stores distance information of each object together with a color image of a library. On the other hand, the three-dimensional position/posture of the user and the three-dimensional position of the real world are recognized by various sensors and, hence, a virtual space generation module 101 gives a convergence angle and field angle corresponding to the detected position/posture of the user upon merging the virtual images.

A characteristic feature of this system lies in that an agent layout support module 400 optimally determines the display position/posture of the agent character in correspondence with the viewpoint position of the user.

Examples of rules in which an agent layout module of this system determines the display position/posture of the agent character will be explained below with reference to FIGS. 5 to 7.

Figure 5:
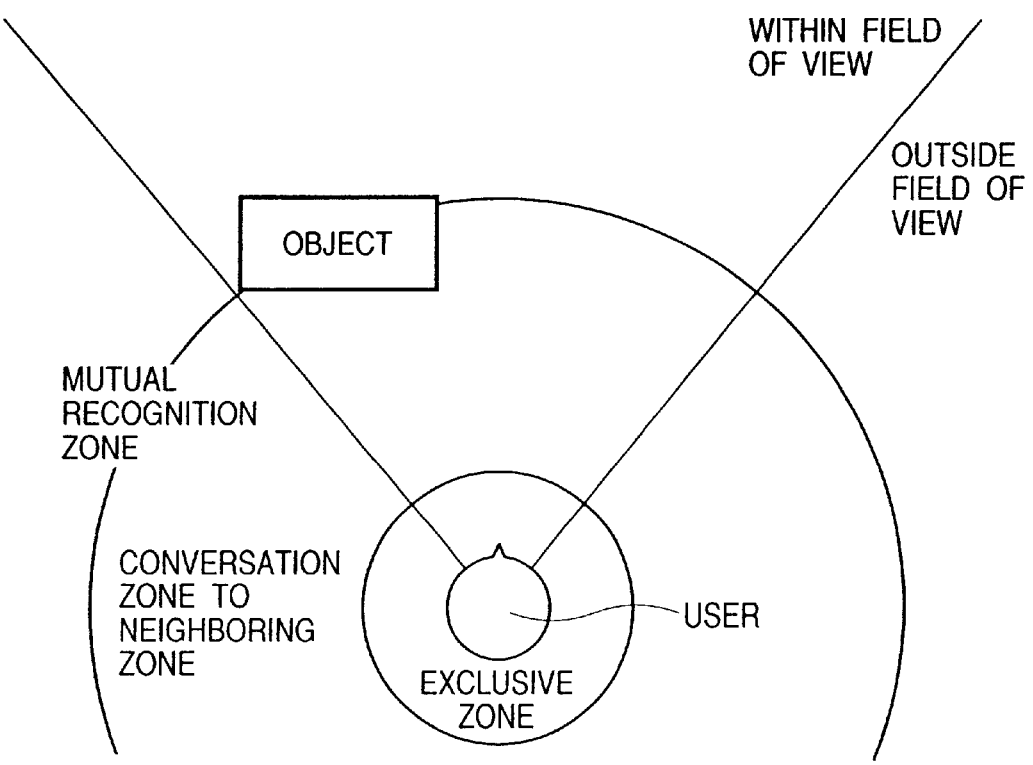
FIG. 5 is a view for explaining the principle of agent layout according to the system shown in FIG. 3.

FIG. 5 shows an example of the layout of the user and a real object of interest of the user in a three-dimensional space (a virtual space or a space obtained by superposing the virtual space and real space).

The agent layout support module 400 determines the area where the agent can be laid out as follows. The module 400 determines an "exclusive zone", "conversation zone", "neighboring zone", and "mutual recognition zone" to have the user as the center. These four zones may be set on concentric circles corresponding to distances from the user, or may be set as zones with a predetermined shape to have the user as the center. In this example, if r(m) represents distance from the user, the exclusive zone is set to satisfy:

$$0m < r < 0.5$$

Since the user wants nobody to enter this exclusive zone, he or she does not want the agent character to appear in this zone, either. Outside the exclusive zone, the module 400 sets in turn:

$$\text{Conversation zone } (0.5m < r < 1.5m) \rightarrow \text{neighboring zone}$$
$$(1.5m < r < 3m) \rightarrow \text{mutual recognition zone } (3m < r < 20m)$$

In consideration of these zones, the module 400 determines the layout position of the agent character according to the following RULE 1 to RULE 8:

RULE 1: display no agent character in the "exclusive zone";

RULE 2: keep the agent character in the "mutual recognition zone" when no communication is made with the user;

RULE 3: locate the agent character in the "neighboring zone" or "conversation zone" when a communication is made with the user;

RULE 4: appropriately move the agent character not to occlude a target object when a communication is made with the user;

RULE 5: locate the character not to be occluded by the target character;

RULE 6: locate the character not to invade another object;

RULE 7: locate the character within the field of view of the user when the agent communicates with the user; locate the character near the field of view or outside the field of view when the agent does not communicate with the user; and RULE 8: when there is a target object, locate the character where a manipulation system (e.g., the hand of a person) can access the object.

If there are more than one locations that satisfy RULE 1 to RULE 8, the module 400 applies the following rules:

RULE 9: locate the agent at a position closest to the object; and

RULE 10: locate the agent at a position closest to the user position when there is no object.

If there are more than one locations that satisfy RULE 1 to RULE 10, the module 400 locates the agent at one of these locations.

If there is no location that satisfies RULE 1 to RULE 8, the module 400 applies the following RULE:

RULE 11: locate the agent within the mutual recognition zone by ignoring the condition "within the neighboring zone/conversation zone".

If no appropriate location is found yet, the module 400 applies the following rules:

RULE 12: locate the character outside the field of view.

As for the level of character, the module 400 applies the following rule:

RULE 13: locate the character to float at the eye level of the user or the level of the target object if the agent can float; or locate the character to naturally stand on the ground if the agent cannot float.

As for the character size, the module 400 applies the following general rule:

RULE 14: set the character size to be equal to or smaller than the average person size so as to allow the user to recognize the existence of the agent in a manner equivalent to that of an actual person.

Figure 6:
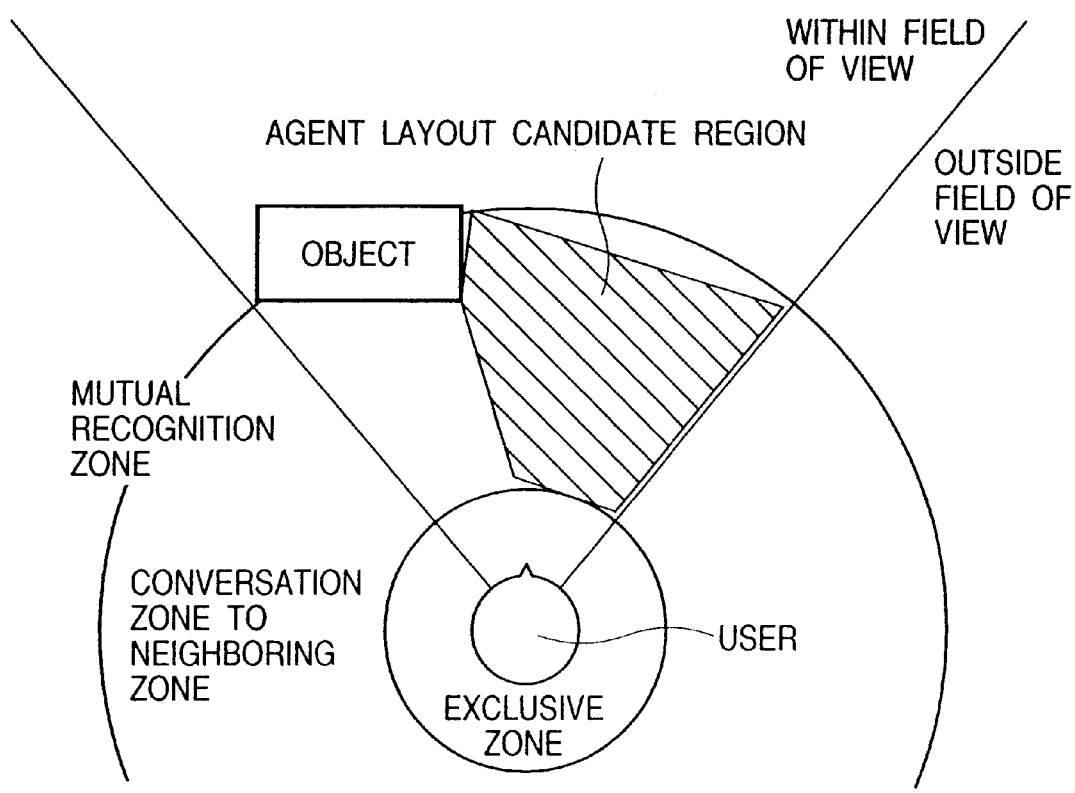
FIG. 6 is a view for explaining the principle of agent layout according to the system shown in FIG. 3.
Figure 7:
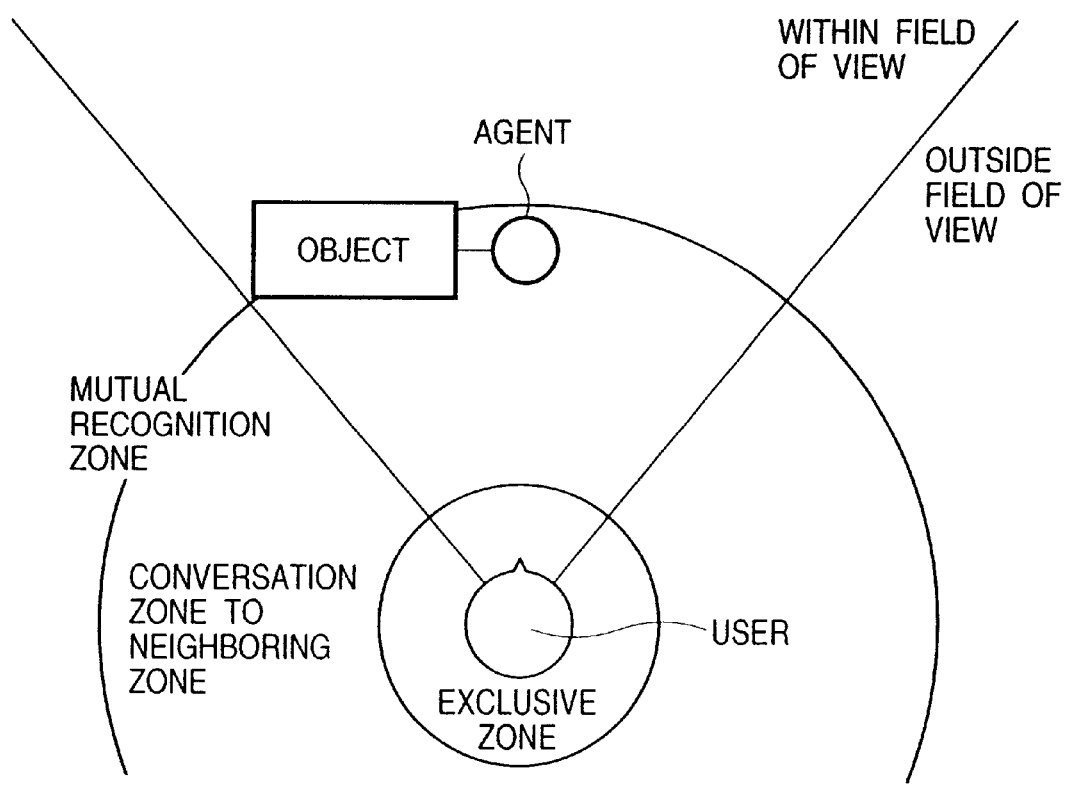
FIG. 7 is a view for explaining the principle of agent layout according to the system shown in FIG. 3.

In the example shown in FIG. 5, when the above rules are applied to a case wherein an interaction with the user is required, a zone shown as an "agent layout candidate zone" in FIG. 6 is determined as a candidate zone where the agent is to be displayed.

In this example in which the present invention is applied to the library database system, assume that the agent character is given a manipulation system for picking up a book. That is, assume that the user picks up a book displayed as a virtual image by the virtual "hand" of the agent character or a desired book of the user is pointed by the virtual "hand" of the agent character in a VR or MR environment. In such case, the final agent position (except for its level) is determined by adding conditions that "the manipulation system of the character" can "just access" the target object (a book in this example), and "the agent is located at a position closest to the object". In this example, the agent position is determined, as shown in FIG. 7.

Finally, the agent is located at the level of the target object or the level with which the agent can naturally stand on the ground in accordance with whether or not the agent can float.

Figure 8:
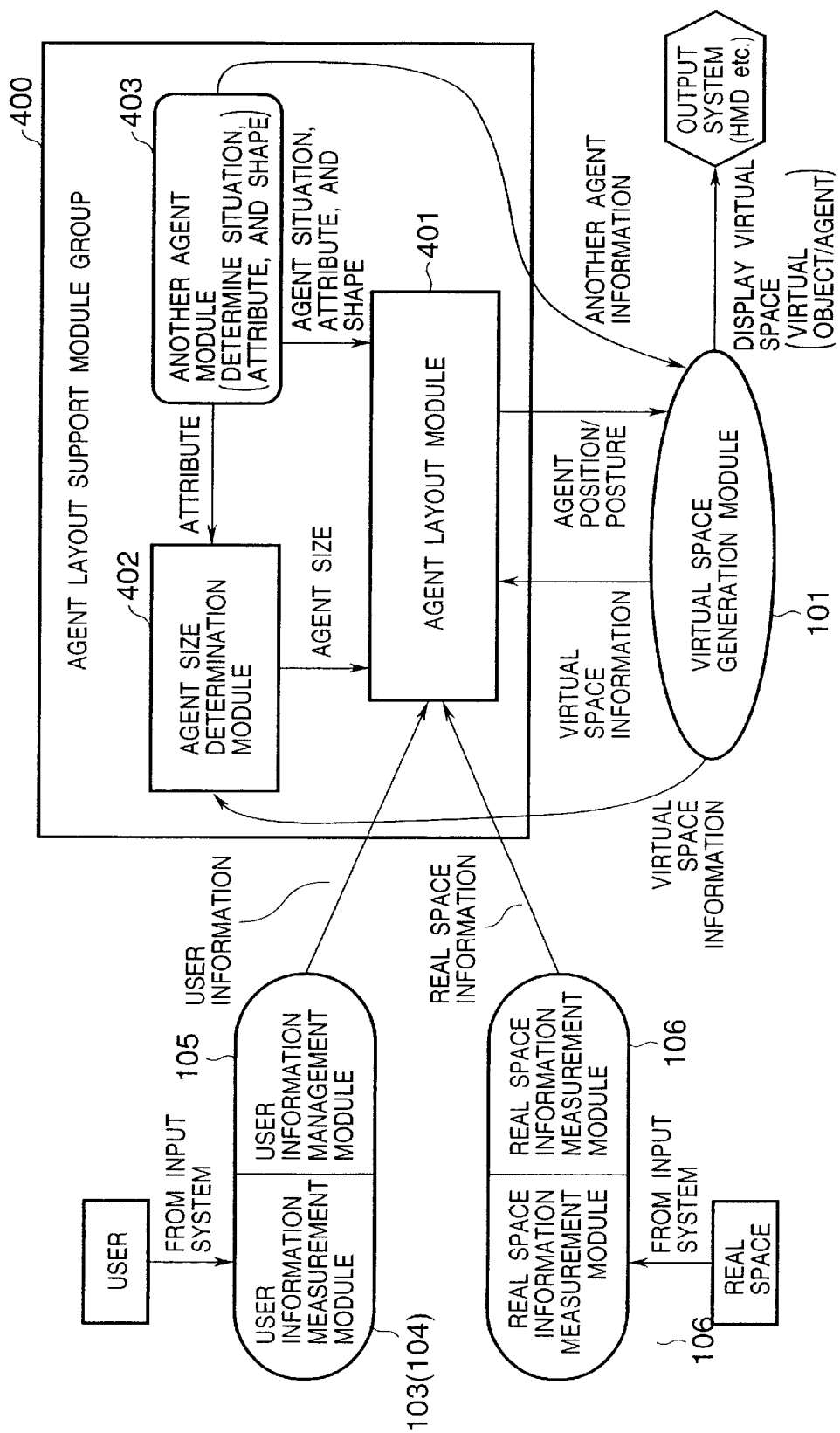
FIG. 8 is a block diagram showing the system arrangement of the system shown in FIG. 3 in more detail.

FIG. 8 shows the arrangement of the system for checking the aforementioned rules to determine the display position of the agent, i.e., a program interface.

Referring to FIG. 8, the agent layout support module group 400 has an agent layout module 401, agent size determination module 402, and another agent module 403. These modules are coupled via application program interfaces (APIs; to be described later). Also, the agent layout support module group 400 is connected to the virtual space generation module 101 via predetermined APIs.

As described above, this system determines an optimal layout of the agent character in correspondence with the position/posture of the user. Note that a user measurement module (103, 104) computes the position/posture or the like of the user on the basis of the aforementioned sensor information, and passes such data onto a user information management module 105. This module 105 tracks and manages the position/posture of the user. The managed user information is sent to the agent layout module 401 in real time via APIs. The agent layout module 401 requires real space information and virtual space information as inputs in addition to the user information, as will be described later. The user information includes:

data 1: user position with respect to reference position; and data 2: user posture Note that the reference position indicates a reference used upon merging the real space and virtual space, and the position is expressed by coordinates (x, y, z). The posture indicates angles (roll, pitch, yaw), and the user position and posture indicate the viewpoint position and posture of the user.

The real space information is measured by a real space information measurement module, and is managed by a real space information management module. This managed real space information is also sent to the agent layout module 401 via APIs. The "real space information" includes:

data 1: position of real object with respect to reference position;

data 2: posture of real object;

data 3: size of real object; and data 4: shape of real object.

On the other hand, the position/posture of the agent character, the layout of which has been determined, is sent from the layout module 401 to the virtual space generation module 101 via APIs, and the module 101 generates an image of the agent to merge the agent character with the virtual space or to be matched with the real space and outputs and displays the generated image on the HMD or the like.

Interface information in the APIs between the virtual space generation module 101 and agent layout support module group 400, i.e., "agent information" will be explained below.

The agent information is required to present the agent to the user, and is classified into three types of information, i.e., the one output from the layout module 401, the one used by the layout module 401, and another information. This information is passed onto an agent output module group including the virtual space generation module 101.

The information output from the layout module 101 to the virtual space generation module 101 includes:

data 1: agent position with respect to reference position; and data 2: agent posture.

The information used by the layout determination module includes:

data 1: agent size; and data 2: agent shape (pose).

Another information includes:

data 1: agent appearance (expression or the like); and data 2: agent voice.

As described above, the size and shape of the agent are important factors to prevent the target object from being occluded and to prevent the user from experiencing coerced feeling, as well as to allow the user to easily recognize the agent.

The agent size is defined in advance in the agent system by the size determination module in accordance with an object to be handled by the agent and the task contents of the agent before the layout is determined.

The agent shape is a shape model of the agent character prepared in the agent system. This shape structure can be changed. That is, the pose of the agent can be changed. The shape (pose) is changed in correspondence with the agent situation.

Figure 9:
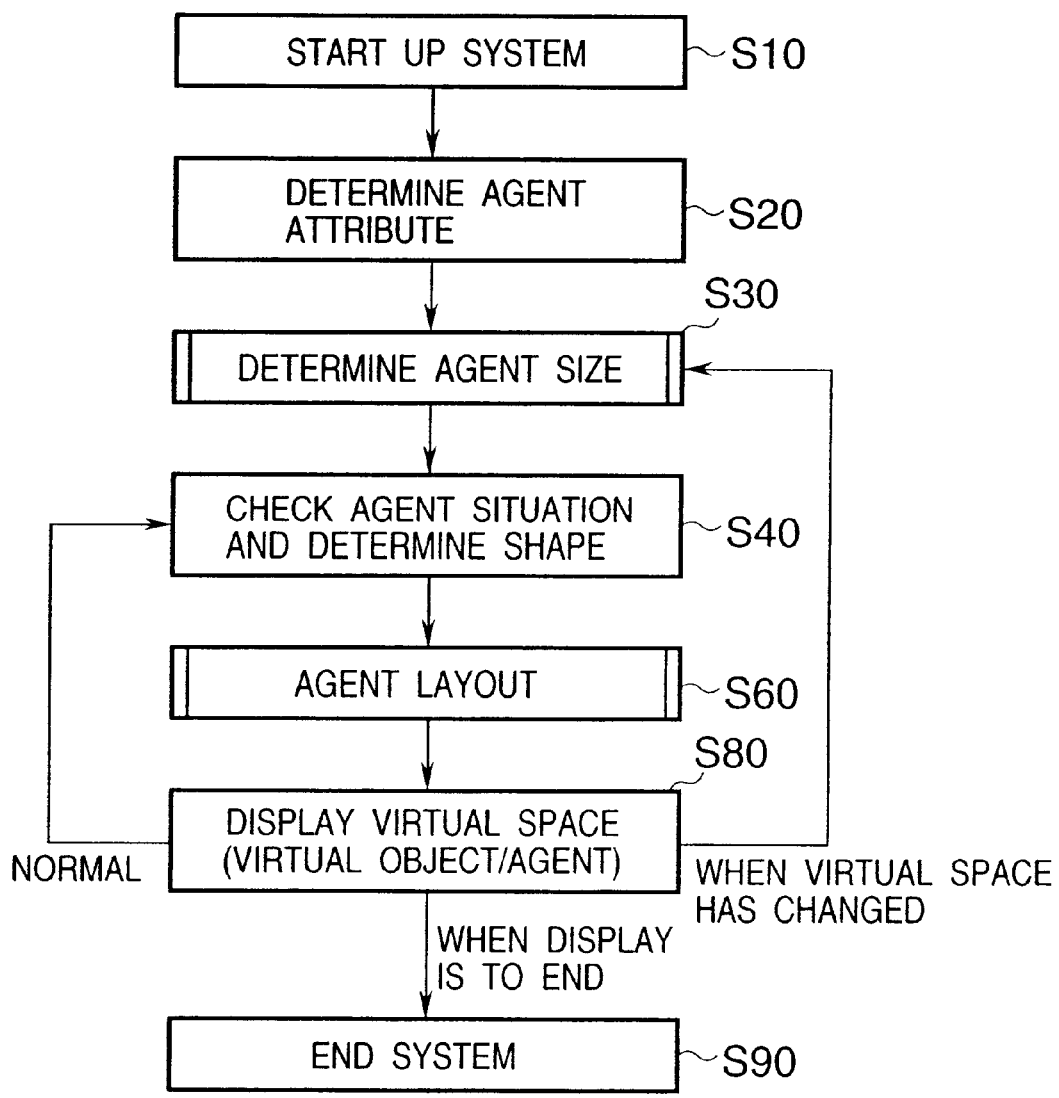
FIG. 9 is a flow chart for explaining the overall control sequence of an agent layout support module group 400.

FIG. 9 shows the overall processing sequence of the agent layout support module group 400.

In step S10, the system is started up and a predetermined initialization process is done.

In step S20, attributes of the agent are determined. Note that "floatability" and "personality/role" are assigned as "attributes of the agent" in this embodiment. This is because the layout reference must be changed in correspondence with the attributes of the agent. The attributes of the agent determined in step S20 are stored in a predetermined memory. The attribute data in the memory are read out in step S500 in FIG. 10, and are used in step S730. In step S730, if an agent is assigned a "floatability" value, RULE 15: locate the face (or corresponding) portion of the agent at the level of the line-of-sight position of the user or the level of the target object is applied. On the other hand, if an agent cannot float, RULE 16: locate the agent to naturally stand on the ground or an object (or hang on it and so forth) is applied. If a value "intrusive or obtrusive" is set as "personality/role", RULE 17: locate the agent to possibly fall within the field of view of the user is applied; if a value "unobtrusive" is set, RULE 18: locate the agent to possibly fall within a region around the field of view is applied.

Note that the attributes and layout rules based on the attributes should be determined depending on each specific module design.

After the attributes of the agent are determined, the agent size is determined in step S30. In step S30, the size determination module 402 is launched to determine the agent size. As can be seen from the flow chart shown in FIG. 9, this module 402 is launched upon starting up the agent system (after step S20) and after step S80 upon movement in the virtual space. In this embodiment, the agent size is not that on the screen but that in the space. Note that as agent attributes, a "space dependent/independent" size can be set in addition to "floatability" and "personality/role". When a "space independent" size is set, for example, when the agent is a copy of an existing person or the like, a given value is passed onto the layout module as the size. The agent size rules include:

RULE 19: set substantially the same scale as that of an object to be handled by the agent (for example, when the agent handles a miniature object, the agent is also set to have a miniature size; when it handles a normal object, the agent is set to have a size falling within the range from small animals to average person);

RULE 20: set a size equal to or smaller than that of an average person so as not to give anxious feeling to the user; and RULE 21: ignore RULE 20 under the condition that the agent who handles a giant object far away from the user does not give any anxiety to the user.

The agent size determined according to the aforementioned rules are stored in the predetermined memory, and is read out in step S400 upon execution.

The loop of step S40→step S60→step S80→step S40 passes the determined "agent information" onto the virtual space generation module 101 so as to determine the agent shape and layout and to display the determined result in correspondence with an agent situation. An event that requires this loop is a change in agent situation.

The loop of step S30→step S40→step S60→step S80→step S30 is executed when the virtual space has changed.

In step S40, the agent situation is checked, and the agent shape is determined. This is because the layout reference of the agent may change depending on the agent situation. The agent situation is determined by a command input from the user or by scenario, and is defined in the agent before the layout is determined. In this embodiment, an "instruction wait mode" from the user, "object manipulation mode" of the user, and "conversation mode" with the user are set as the "agent situation". That is, in the "instruction wait mode", RULE 22: locate the agent not to be against user's interest (e.g., not to occlude an object) is applied. In the "object manipulation mode", RULE 23: locate the agent at a position where the agent can naturally manipulate the object and which is not against user's interest is applied. In the "conversation mode", RULE 24: locate the agent at the center of the field of view of the user is applied.

The "agent situation" determined in step S40 is stored in the predetermined memory, and is read out in step S600.

In step S60, the layout of the agent is finally determined. Details of step S60 are shown in the flow charts of FIGS. 10 and 11.

Figure 10:
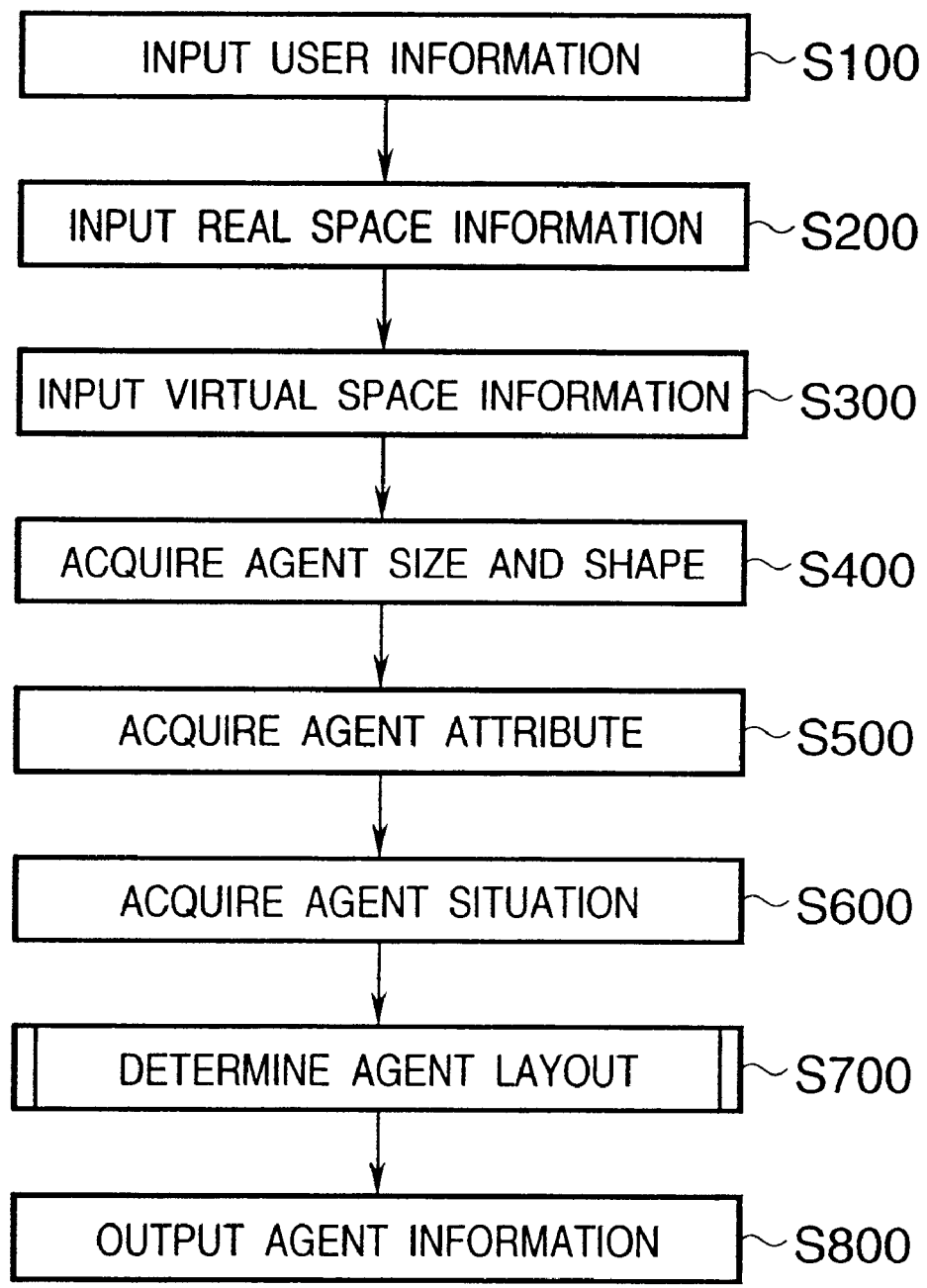
FIG. 10 is a flow chart for explaining the control sequence of an agent layout module 401.

More specifically, in step S100 in FIG. 10 the "user information", which is managed by the user information management module 105 and stored in the predetermined memory, is read out. With this information, the layout module 401 can detect the position/posture of the user. In step S200, the "real space information", which is managed by a real space management module 106 and stored at a predetermined memory address, is input. In step S300, virtual space information generated by the user application program is input from the virtual space generation module 101.

In step S400, the agent size, which is determined and stored in the memory in step S30, and the agent shape, which is determined in step S40, are acquired. In step S500, the agent attributes determined in step S20 are acquired. In step S600, the agent situation determined in step S40 is acquired. In step S700, the agent layout is determined by applying the aforementioned RULEs using the acquired user information, real space information, virtual space information, agent size, agent shape, agent attributes, agent situation, and the like. More specifically, the "attributes", "personality/role", and basic "shape" of the agent are determined before step S700, and they never change along with the progress of the application program. On the other hand, the user information, real space information, virtual space information, and agent situation change along with the progress of the program. Hence, in step S700 the shape and size of the "agent" roughly determined based on the "attributes", "personality/role", and basic "shape", i.e., the layout and display pattern of the agent are determined in correspondence with changes in the "user information", "real space information", "virtual space information", "agent situation", and the like. Step S700 is described in detail in steps S710 to S750 in FIG. 11.

More specifically, in step S710 the shape of the agent, i.e., pose, is changed in correspondence with the acquired agent situation. In step S720, RULE 22 to RULE 24 are applied in accordance with the agent situation to determine zone candidates where the agent can be located.

In step S730, the candidates determined in step S720 are narrowed down to fewer candidates in accordance with the agent attributes using RULE 15 to RULE 18.

In step S740, RULE 1 to RULE 8 and RULE 22 to RULE 24 are applied on the basis of various kinds of input information such as the "user information", "real space information", "virtual space information", and the like, agent size, agent shape, and agent situation to narrow them down to still fewer, relevant candidates. In step S750, the display position/posture of the agent character is finally determined by applying RULE 9 to RULE 13.

In step S760, agent information is computed based on the layout position. In step S800 in FIG. 10, the agent information is output to the virtual space generation module 101.

The present invention is not limited to the above embodiment.

For example, the present invention is applied to the library information database in the above embodiment. However, the present invention is not limited to such specific application, but may be applied to every application fields that require an agent.

In the above embodiment, the application program and agent are programs independent from the position system. However, the present invention is not limited to such specific system, but they may be integrated.

The present invention is not limited to a three-dimensional display environment. Even in a two-dimensional display environment, distance information can be saved, and the positional relationship between the agent and user can be considered on the basis of the saved distance information.

When the layout program (agent layout determination module) of the agent layout method is built in the operating system, the user application program such as the database application program or the like need only describe the aforementioned program interface in the program, thus improving program productivity. In such case, the program to be built in the operating system is preferably stored in a CD-ROM or the like solely or together with other programs. This CD-ROM is inserted into the workstation or PC in which the operating system has already been installed to load the aforementioned module.

Note that APIs have been exemplified as program interfaces in the above embodiment. However, the present invention is not limited to such specific interface, and any other existing or newly developed program interfaces can be used.

To restate, according to the present invention, a user interface environment which is not against user's interest in terms of manipulations can be provided.

As many apparently widely different embodiments of the present invention can be made without departing from the spirit and scope thereof, it is to be understood that the invention is not limited to the specific embodiments thereof except as defined in the appended claims.

What is claimed is:

1. An information processing method for determining a layout position of an agent in a three-dimensional space, which is either a virtual reality space or a mixed reality space obtained by superposing the virtual reality space onto a real space, and for displaying the agent based on the determined layout position, the method comprising the steps of:

inputting a location of a user;

inputting a command designated by the user;

determining a plurality of layout candidates of the agent in the three-dimensional space based on an interaction condition between the agent and the user which is determined based on the inputted command; and determining a layout location of the agent from among the plurality of layout candidates based on the location of the user and a location of a target object, wherein the step of determining the plurality of layout candidates determines the plurality of layout candidates such that the distance between the agent and the user when no interaction between the agent and the user exists is larger than when interaction exists, by using a rule that corresponds to the interaction condition between the agent and the user.

2. The method according to claim 1, wherein the step of determining a layout location of the agent determines the layout location of the agent from among the plurality of layout candidates such that the agent is not occluded by a target object.

3. The method according to claim 1, wherein the step of determining the plurality of layout candidates determines the plurality of layout candidates of the agent based on an attribute of the agent.

4. The method according to claim 1, wherein the step of determining a layout location determines the layout location of the agent from among the plurality of layout candidates such that the agent does not occlude the target object.

5. An information processing apparatus to determine a layout position of an agent in a three-dimensional space, which is either a virtual reality space or a mixed reality space obtained by superposing the virtual reality space onto a real space, and to display the agent based on the determined layout position, the apparatus comprising;

a location input unit adapted to input a location of a user; and a command input unit adapted to input a command designated by the user;

a layout candidates determining unit adapted to determine a plurality of layout candidates of the agent in the three-dimensional space based on an interaction condition between the agent and the user which is determined based on the inputted command; and a layout location determining unit adapted to determine a layout location of the agent among the plurality of layout candidates based on the location of the user and a location of a target object, wherein the layout candidates determining unit determines the plurality of layout candidates such that the distance between the agent and the user when no interaction between the agent and the user exists is larger than when interaction exists, by using a rule that corresponds to the interaction condition between the agent and the user.

6. A computer-readable recording medium containing a control program for controlling a computer to serve as an information processing apparatus to determine a layout position of an agent in a three-dimensional space, which is either a virtual reality space or a mixed reality space obtained by superposing the virtual reality space onto a real space, and to display the agent based on the determined layout position, said control program comprising:

a location input program code for obtaining a location of a user from an input means;

a command input program code for obtaining a command indicating an instruction of the user from a command inputting means; and a layout candidates determining program code for determining a plurality of layout candidates of the agent in the three-dimensional space, based on an interaction condition between the agent and the user which is determined based on the inputted command; and a layout location determining program code for determining a layout location of the agent from among the plurality of layout candidates based on the location of the user and a location of a target object, wherein the layout candidates determining procedure determines the plurality of layout candidates such that the distance between the agent and the user when no interaction between the agent and the user exists is larger than when interaction exists, by using a rule that corresponds to the interaction condition between the agent and the user.

* * * * *

UNITED STATES PATENT AND TRADEMARK OFFICE
CERTIFICATE OF CORRECTION

PATENT NO. : 6,559,870 B1
DATED : May 6, 2003
INVENTOR(S) : Mahori Anabuki et al.

It is certified that error appears in the above-identified patent and that said Letters Patent is hereby corrected as shown below:

<u>Title page,</u>
Item [56], References Cited, OTHER PUBLICATIONS, 1$^{st}$ reference, "Space:", should read -- Space, -- and 2$^{nd}$ reference, "World" should read -- World," --.

<u>Column 1,</u>
Line 30, "a" should be deleted.

<u>Column 10,</u>
Line 66, "fields" should read -- field --; and
Line 67, "require" should read -- requires --.

<u>Column 12,</u>
Line 14, "and" should be deleted; and
Line 45, "and" should be deleted.

Signed and Sealed this

Second Day of December, 2003

JAMES E. ROGAN
*Director of the United States Patent and Trademark Office*